United States Patent [19]
Mogul

[11] Patent Number: 6,052,764
[45] Date of Patent: Apr. 18, 2000

[54] COMPUTER DATA RESTORATION ASSEMBLY AND ASSOCIATED METHOD

[75] Inventor: Jeffrey Clifford Mogul, Menlo Park, Calif.

[73] Assignee: Compaq Computer Corportion, Houston, Tex.

[21] Appl. No.: 08/994,364

[22] Filed: Dec. 19, 1997

[51] Int. Cl.⁷ .................................................. G06F 11/00
[52] U.S. Cl. .................................. 711/162; 714/7; 714/8; 711/111; 711/161
[58] Field of Search ...................... 714/6–8, 47; 711/111, 711/114, 161, 162

[56] References Cited

U.S. PATENT DOCUMENTS

| | | | |
|---|---|---|---|
| 5,163,148 | 11/1992 | Walls . | |
| 5,333,315 | 7/1994 | Saether et al. | 707/1 |
| 5,742,792 | 4/1998 | Yanai et al. | 711/162 |
| 5,778,395 | 7/1998 | Whiting et al. | 707/204 |
| 5,873,085 | 2/1999 | Enoki et al. | 707/10 |

*Primary Examiner*—John W. Cabeca
*Assistant Examiner*—Pierre-Michel Bataille
*Attorney, Agent, or Firm*—Fenwick & West

[57] ABSTRACT

An assembly, and an associated method, that facilitates restoration of data to a computer data storage subsystem subsequent to failure and repair of the subsystem. An identification indicia memory contains an up-to-date listing of the file name, or other identification indicia, of data stored at the data storage subsystem. The listing is accessed and used to retrieve a copy of data stored at the storage subsystem prior to its failure. Recovery operations write the copy of the data to the repaired or replaced storage medium of the data storage subsystem.

22 Claims, 3 Drawing Sheets

COMPUTER DATA RESTORATION ASSEMBLY AND ASSOCIATED METHOD

FIELD OF THE INVENTION

The present invention relates generally to data storage and more particularly to restoring data, including computer programming, subsequent to failure of a primary bulk storage medium.

BACKGROUND

Maintenance of data stored at a storage subsystem, which includes a primary bulk storage medium, is essential to the operation of a computer system. Accordingly, storage subsystems are constructed to minimize, to the extent practicable, the likelihood that the storage subsystem will fail or otherwise prevent normal access to the stored data. Despite these efforts, however, failure of storage subsystems sometimes occurs.

Therefore, the master copy of data stored at a storage subsystem is sometimes stored on another storage device. However, even if master copies of the data are kept, the process of reconstructing the data using the master copy, e.g., retrieving and restoring the data to a storage subsystem, can be quite laborious.

Even the storage subsystem and other storage device are connected together in a network, i.e., a WAN, a LAN, a cluster, the Internet or any other type of network, if the storage subsystem fails, reloading the storage subsystem with master-copy data stored on the other storage device typically requires requests for the master-copy data to be manually-generated. This exercise can take a particularly lengthy time period.

The user's involvement in reloading data can be reduced by "pre-loading" the replacement storage subsystem at the repair facility with a master copy of the failed system files. This, at least from the user's standpoint, permits a substantial reduction in the time required for reloading operations when compared with manual user-generated requests.

In order to reload or pre-load the master-copy data, the identity of the data stored on the failed storage subsystem must be known. This requires the user to remember or keep an updated, separate inventory of the data stored on the storage subsystem. Typically, even those users who try to maintain a separate updated inventory of the data stored will occasionally fail to properly update the inventory.

Further, even if a separate, updated inventory is properly maintained, or master-copies of the data exist, manually generated requests to download the master-copies of the data will be required to reload or pre-load the data.

OBJECTS OF THE INVENTION

It is, accordingly, an object of the present invention to reduce the time and effort required to restore data to a storage subsystem.

It is a further object of the present invention to facilitate the restoration of data to a repaired or replaced storage subsystem after failure of the original storage subsystem.

It is yet another object of the present invention to provide further advantages and features, which will become apparent to those skilled in the art from the disclosure, including the preferred embodiment(s), which shall be described below.

SUMMARY OF THE INVENTION

The present invention provides a system and an associated method for storing data of any type, including programed instructions to a computer system subsequent to failure of a storage medium which, for example, may be associated with a personal computer or a network computer.

The system includes a first memory, which could be a hard drive, RAM, EEPROM, Flash-RAM, an optical disk, tape or any other storage device. The first memory can be considered a primary storage device. The system further includes a second memory, which could be a RAM with battery back-up, EEPROM, Flash-RAM, disk, tape, optical disk, or any other storage device. Preferably, the second memory is a small, low-cost, high-reliability device.

The second memory serves as a secondary storage device and is configured to store a list that includes identifiers. Each identifier is associated with data, which may be in the form of files, stored on the first memory. The second memory is not configured to store the entire data, e.g., complete content of the files contained on the first memory.

The second memory, in association with each identifier, can store a wide variety of additional information, including but not limited to: file names, file unique identifiers, URLs (Universal Resource locators), URNs (Universal Resource Names), URIs (Universal Resource Identifiers), X.500 Names, and date/time of most recent file use.

The first memory can be connected to a network so as to be capable of receiving files from a separate storage device, such as a server, via the network. The separate storage device could be linked to the first memory through a WAN, a LAN, clusters, the Internet, or any other type of network.

The file restoration system also includes a processor configured to operate after the failure of the first memory. Specifically, the processor is configured to receive the identifiers stored on the second memory to identify files to be restored and to download the files that were contained on the first memory from a storage device containing a master-copy of the files.

For example, when the first memory device fails, the processor can read an identifier stored on the second memory. The processor can then request that the storage device, which contains the master-copy of the file associated with the identifier, transmit a copy of the master file and store that copy on a replacement first memory. Programmed instructions for directing the processor to retrieve the identifiers stored on the second memory, identify the desired files from the identifiers, request a copy of the desired files from the master storage device and store the downloaded copy are beneficially stored on either the second memory or some other secondary memory.

The first and second memories are on separate storage devices. For example, the first memory could be a hard drive on a personal computer, and the second memory could be an EEPROM device. Alternatively, the first memory could be a RAM on a personal computer, and the second memory could be an EEPROM. Preferably, the second memory is non-volatile.

In addition to storing an identifier, the second memory can store prioritization information associated with files stored on the first memory. This prioritization information can be used for determining the order in which files are retrieved and/or loaded onto a replacement first memory. Further, prioritization information can be used to indicate files that were originally stored on the first memory but that are not to be stored on the replacement first memory.

In practice, the second memory will typically store an identification of any file located on the first memory. The identification may be stored on the second memory before, after, or simultaneously with, and preferably contemporaneous with, the file being stored on the first memory. Assuming a file is removed from the first memory, the identification is removed from the second memory. Again, the identification can be removed before, after, or simultaneously with, an preferably contemporaneous with, the file being removed from the first memory.

After the first memory fails, the present invention allows an up-to-date list that identifies each file that was stored on the first memory when it failed to be accessed. Using that list, a copy of the files stored on the failed first memory are retrieved and are then stored on a new first memory.

A more complete appreciation of the present invention and a scope thereof can be obtained from the accompanying drawings which are briefly summarized below, the following detailed description of the presently preferred embodiments of the invention, and the appended claims.

DETAILED DESCRIPTION

Figure 1:
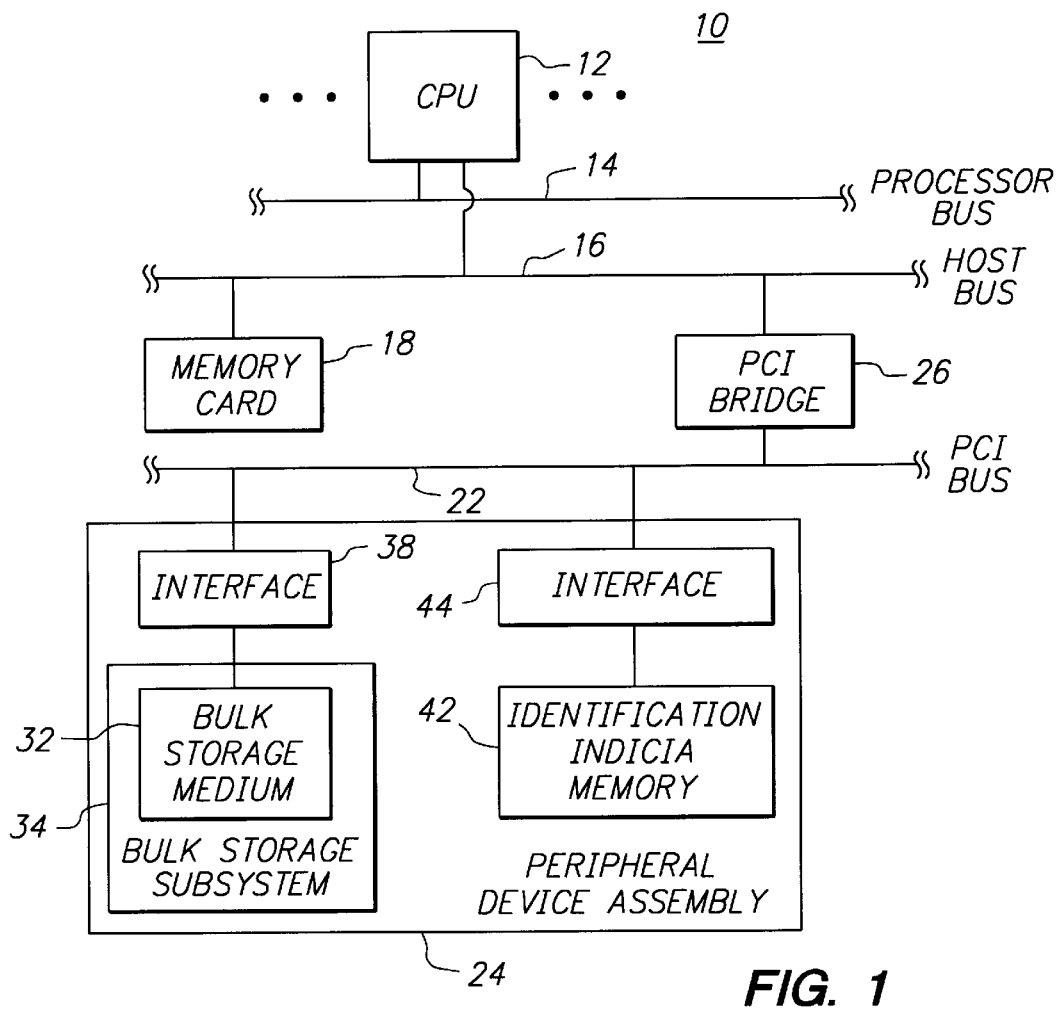
FIG. 1 depicts a simplified computer system in accordance with the present invention.

Referring first to FIG. 1, a somewhat simplified computer system 10 includes CPU (central processing unit) 12, connected to other system components or elements (not shown) by way of a processor bus 14. The CPU 12 is further coupled by a host bus 16 to other system components, such as a memory card 18. The computer system 10 also includes a PCI (peripheral component interface/interconnect) bus 22 for connecting to peripheral device assembly 24. The PCI bus 22 is coupled to the host bus 16 by a PCI bridge 26.

The assembly 24 includes a bulk storage medium 32. The bulk storage medium 32 is formed, e.g., of a hard disk or floppy diskette, magnetic tapes, RAM (random access memory), with or without battery back-up, EEPROM (electrically erasable programmable read only memory) or flash RAM optical disk or other medium. Such bulk storage medium forms a portion of a bulk storage subsystem 34.

The bulk storage subsystem 34 is coupled to the PCI bus 22, by an interface 38. In a conventional manner, data is written to, and read from the bulk storage medium 32 during normal operation of the computer system.

The assembly 24 further includes an identification indicia memory 42. The memory 42 is formed of a non-volatile memory to which data can be written and read. The memory 42 can be comprised, e.g., of flash RAM, EEPROM, battery backed-up RAM, or other medium. In the illustrated embodiment, the identification indicia memory 42 is coupled to the PCI bus 22 by way of an interface 44.

Figure 2:
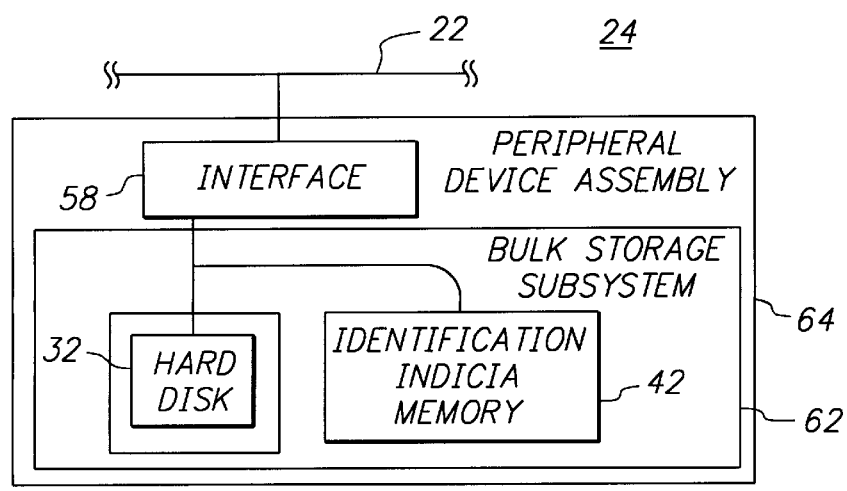
FIG. 2 depicts a alternative arrangement of the FIG. 1 storage subsystem.

Connection of the memory 42 to the PCI bus 22, in another embodiment and as shown in FIG. 2, is formed by way of the interface 58. The functionality of both the interfaces 38 and 44 are contained in a single interface device 58. In this later embodiment, the memory 42 is incorporated within the bulk storage subsystem 62 of the peripheral device assembly 64.

The memory 42 is operable at least to store identification indicia associated with the data stored at the bulk storage medium 32. The data is segmented into files. The identification indicia stored at the memory 42 forms, e.g., the file names of the files of data stored at the bulk storage medium 32. As data files are written to, or removed from, the bulk storage medium 32 during operation of the computer system 10, the memory 42 is updated accordingly.

That is to say, each time a new file or other data is written to the bulk storage medium 32, an identification indicia of the data is added to a listing formed at the memory 42. Additionally, each time a file or other data is removed, e.g. deleted, from the bulk storage medium, the identification indicia associated with such data is removed from the listing.

Prioritization information associated with the files may also be stored at the memory 42 with the identification indicia. The prioritization information determines the order in which the files will be restored. The prioritization information is also updated as data is written to, or removed from the bulk storage medium 32. Updating of files stored at the bulk storage medium 32 need not necessarily result in corresponding alteration of the identification indicia.

The identification indicia is preferably prioritized according to a selected policy. If the replacement bulk storage medium 32 of the substitute bulk storage subsystem 34 has less storage capacity than the capacity of the storage medium that is replaced, the higher-priority data will be stored at the storage medium 32.

The identification indicia memory 42 is separate from the bulk storage medium 32. The subsystem 34 and the memory 42 can be removable. One or both of the bulk storage subsystem 34 and the memory 42 may, for instance, be installed in a plugged connection in the assembly 24 or 64.

Alternately, the assembly 24 or 64 may be removable from the computer system 10. In either case, repair or replacement can be effectuated and the data can be restored at a new bulk storage medium by retrieving the data identified by the listing forming the memory 42.

It will be recognized that restoration can also be carried out when the bulk storage subsystem 34 is to be replaced for reasons unrelated to failure of the storage subsystem 34, such as to upgrade the storage subsystem. The identification indicia stored at the memory 42 is, here again, accessed, subsequent to replacement of the bulk storage subsystem, and the master-copies of the data associated with such identification indicia are retrieved and written to the new bulk storage medium of the substitute storage subsystem.

Automatic reloading software stored on memory 42 is executable by CPU 12 to reload the data at the new bulk storage medium 32 from a master-copy storage device. Prioritization, as discussed above, may be addressed by such automatic reloading software. In computer systems having distributed control, the reloading software can be executed by processing circuitry associated, for instance, with the bulk storage subsystem 34.

The identification indicia memory 42 can form a stand alone card, connectable to a standard or non-standard bus. For example, the identification indicia memory 42 can be connectable to the PCI bus 22 or other buses, such as an ISA (industry standard architecture) or EISA (extended industry standard architecture) bus. Or, the memory 42 can form a stand alone SCSI (small computer systems interface) unit, to be used in conjunction with SCSI devices.

Figure 3:
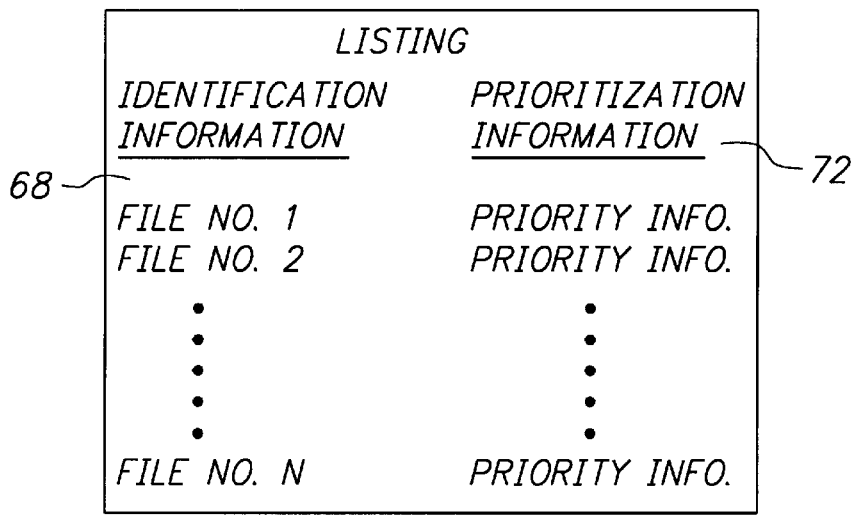
FIG. 3 shows an exemplary data listing in accordance with the present invention.

FIG. 3 illustrates a listing 66, representative of a listing stored at the identification indicia memory 42 shown in the preceding Figures. Here, the listing includes identification information 68 associated with each data file stored at the bulk storage medium 32. Such identification information can be file names of the data files, file unique-identifiers of the data files; URLs (universal resource locators), URNs (universal resource names), URIs (university resource identifiers), or X.500 names.

The listing 66 further includes prioritization information 72 associated with each of the data files. Such prioritization information includes, for instance, date and time of most recent use, date and time of most recent modification, accesses, file size, expected life time, etc.

Figure 4:
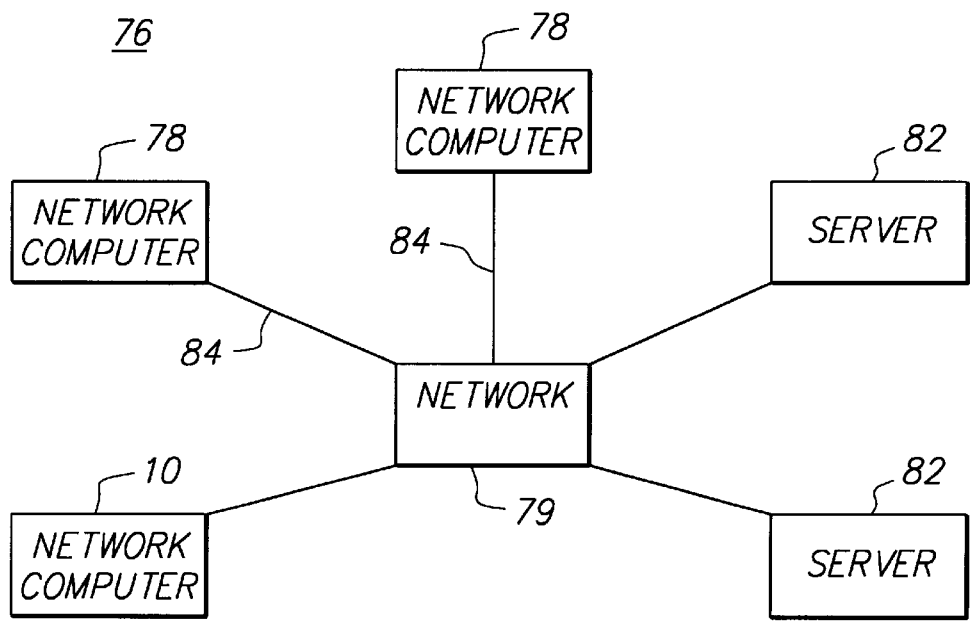
FIG. 4 is a simplified diagram of a computer network including the FIG. 1 computer system.

FIG. 4 illustrates a communications systems 76, which includes the computer system 10. When connected through a network 79, the computer system 10 is sometimes referred to as a network or client computer. The communication system 76 also includes a plurality of other network computers, here computers 78, and servers 82. Network connections are here indicated by the links 84.

In operation, the identifications of the listing formed at the memory 42 are accessed by the system 10 responsive to replacement or repair of the subsystem 34. Master-copies of the files associated with such indicia and stored at other network locations, such as at other network computers 78 or servers 82, are retrieved and stored at the new bulk storage medium 32 of the substitute bulk storage subsystem 34. Preferably this occurs automatically and does not require user intervention.

Figure 5:
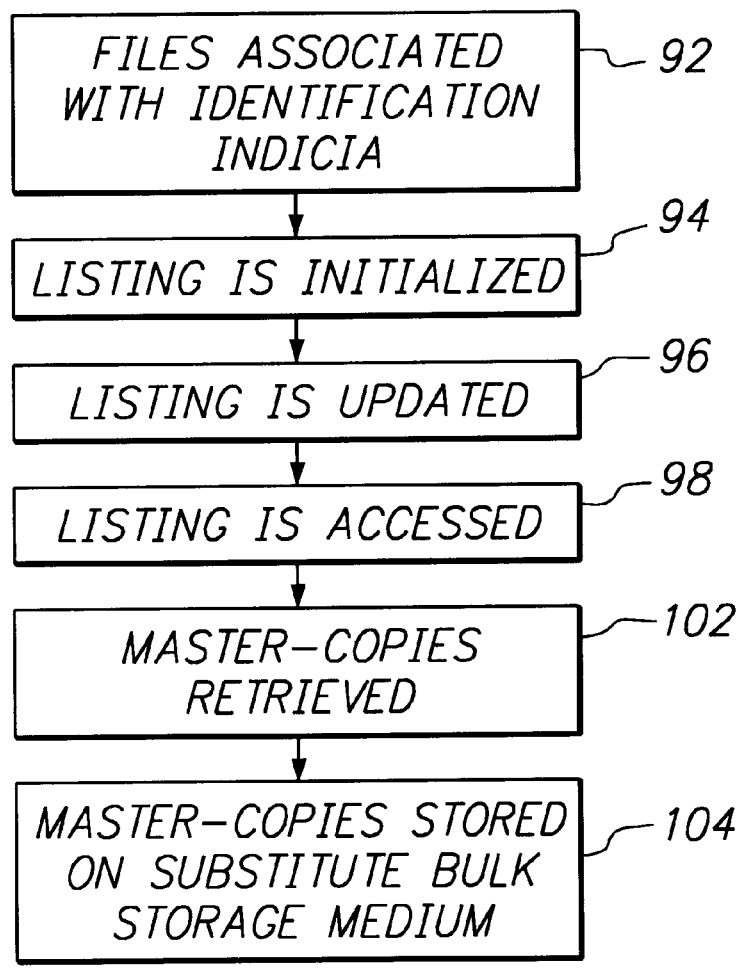
FIG. 5 is a simplified flow diagram of the updating of the FIG. 3 listing.

FIG. 5 illustrates the operation of the computer system 10 to restore data at bulk storage medium 32. First, and as indicated by the block 92, data stored upon primary bulk storage medium 32 are identified with identification indicia or information 68. Then, and as indicated by the block 94, the listing 66, including information 68 and any desired prioritization information 72 is initialized and stored on memory 42. Next, and as indicated by the block 96, the listing 66 is updated to add the identification indicia 68 of each additional file written to, and to remove the identification indicia 68 of each file removed from the primary bulk storage medium 32 so that the memory 42 stores only an updated listing and, if desired, prioritization information 72.

Thereafter, and as indicated by the block 98, the listing 66 is automatically accessed by CPU 12 in accordance with instructions stored on memory 42 upon replacement of the primary bulk storage medium 32. As indicated by the block 102, master-copies of each file of data identified by the identification indicia 68 forming the listing 66 stored on memory 42 are retrieved. The retrieved copies, as indicated by the block 104, are stored on substitute bulk storage medium 32, thereby restoring the data to the computer system.

The above describes preferred implementations of the invention, and the scope of the invention is not necessarily limited by this description. The scope of the present invention is defined by the following claims.

What is claimed is:

1. A system for recording the identity of files stored on a first storage device, comprising:
    an identification memory configured to store an identifier associated with a first file, without storing the entire contents of the first file;
    a first instruction memory configured to store first computer programming;
    a second instruction memory configured to store second computer programming;
    wherein the stored first computer programming is configured to be readable from the first instruction memory by computer and thereby cause the computer to operate so as to:
        store, on the identification memory, an identifier of the first file responsive to the first file contents being stored on the first storage device; and
        remove, from the identification memory, the first file identifier responsive to the first file contents being removed from the first storage device; and
    wherein the stored second computer programming is configured to be readable from the second instruction memory by another computer and thereby cause another computer to operate so as to:
        identify the first file from the identifier stored on the identification memory:
        retrieve the contents of the identified first file from a second storage device; and
        store the retrieved file contents on a third storage device.

2. The system of claim 1, further comprising:
    a first bus configured to link a processor with at least one of the identification memory and the first instruction memory.

3. The system of claim 2, further comprising:
    a second bus configured to link the first storage device with the identification memory.

4. The system of claim 1, wherein the second storage device and the third storage device are connected by a network.

5. The system of claim 1, wherein the second storage device forms part of a network server.

6. The system of claim 1, wherein the third storage device is a replacement for the first storage device.

7. The system of claim 1, wherein:
    the first and the second instruction memories are the same instruction memories; and
    the first computer programming and the second computer programming are the same computer programming.

8. The system of claim 7, wherein the computer and another computer are the same computer.

9. A file restoration system comprising:
    a first memory configured to store data;
    a second memory configured to store a list of identifiers associated with the data stored in the first memory, and wherein, if data is added to the first memory, an identifier associated with the data, but not the data itself, is added to the list of identifiers stored in the second memory, and wherein, if data is removed from the first memory, an identifier associated with the data, but not the data itself, is removed from the list of identifiers stored in the second memory; and
    a processor configured to operate subsequent to a failure of the first memory and to use the list of identifiers stored in the second memory to identify data stored in the first memory and download the identified data from a separate storage device to a replacement first memory.

10. The system of claim 9, wherein the separate storage device is connected to the first memory over a network.

11. The system of claim 9, wherein:
    the second memory is further configured to store prioritization information associated with the data stored in the first memory; and
    the processor is configured to operate to download the identified data from the separate storage device to the replacement first memory in accordance with the prioritization information.

12. The system of claim 9, wherein the processor is configured to operate automatically to identify the data and download the identified data.

13. The system of claim 9, wherein the first and the second memories are separate memory devices.

14. The system of claim 9, wherein the second memory is non-volatile.

15. The system of claim 9, wherein the identifier is associated with the data stored in the first memory and includes at least one identifier selected from the group consisting of a file name, file unique identifier, Universal Resource Locator, Universal Resource Name, Universal Resource Identifier, and X.500 name.

16. The system of claim 9, wherein a capacity of the second memory is less than a capacity of the first memory.

17. The system of claim 16, wherein the capacity of the second memory is less than a capacity necessary to store all of the data stored in the first memory.

18. A method for restoring data at a computer system comprising the steps of:

automatically storing identification indicia of a file to a list stored on a secondary storage device contemporaneous with storing the file on a primary storage device, and automatically removing the identification indicia of the file from the list contemporaneous with removing the file from the primary storage device;

accessing the list upon failure of the primary storage device to identify the stored file;

retrieving a copy of the identified stored file; and storing the retrieved copy upon a substitute primary storage device.

19. The method of claim 18, wherein:

the secondary storage device is separable from the primary storage device; and the primary and the secondary storage devices form part of a storage subsystem.

20. The method of claim 19, comprising, subsequent to failure of the primary storage device, the further steps of:

removing the primary storage device from the storage subsystem; and coupling the secondary storage device to the substitute primary storage device within the storage subsystem.

21. The method of claim 18, wherein the list further includes restoration prioritization information in association with the identification indicia corresponding to the first file.

22. The method of claim 21, wherein the step of retrieving the copy of the identified first file includes retrieving the copy according to restoration prioritization information.

* * * * *